April 29, 1924.
E. M. MICHEL
1,492,044
KNURLING, FLANGING, SHEARING, AND MOLDING MACHINE
Filed Feb. 7, 1922
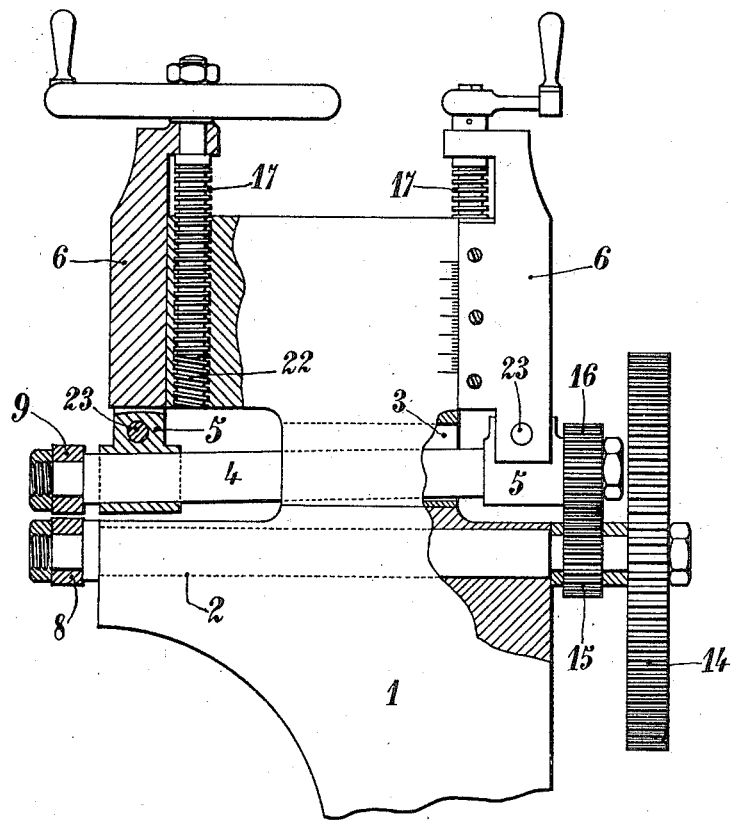
Inventor
E. M. Michel,
By Marks & Clerk
Attys.

Patented Apr. 29, 1924.

1,492,044

UNITED STATES PATENT OFFICE.

EUGÈNE MARCEL MICHEL, OF PARIS, FRANCE.

KNURLING, FLANGING, SHEARING, AND MOLDING MACHINE.

Application filed February 7, 1922. Serial No. 534,793.

*To all whom it may concern:*

Be it known that I, EUGÈNE MARCEL MICHEL, a citizen of the French Republic, residing 117 Rue du Temple, Paris, France, have invented new and useful Improvements in Knurling, Flanging, Shearing, and Molding Machines, of which the following is a specification.

Knurling, flanging shearing and molding machines exist in which the work is effected by two rotary tools, one of which is mounted on a fixed shaft and the other on a shaft capable of being moved; during the operation, this latter tool can be progressively moved towards the other in proportion to the progression of the work.

In machines of this kind, the movable shaft is generally angularly displaceable relatively to a fixed point of the frame; these displacements are controlled by means of a screw which engages with the shaft about midway of its length. The movable shaft, during the operation, is therefore subjected to a bending stress between two bearings and consequently, to a considerable strain.

On the other hand, the axis of oscillation of the movable shaft being fixed, it is not possible to vary in large limits the size of the parts to be worked.

This invention has for its object improvements in knurling, flanging, shearing and molding machines, characterized in that the movable shaft is supported by two bearings arranged near its ends and pivoted on slide blocks capable of translations which may be equal or not and simultaneous.

These improvements offer the following advantages:

1. The leverage of the torque produced by the reaction of the tool and that of the bearing is very small, owing to the fact that the bearings of the movable shaft are placed near its ends. It results therefrom that there is no risk of the shaft being broken or strained.

2. The bearings of the shaft being separately or simultaneously displaceable, it becomes possible:

*a.* To vary the diameter of the tool,

*b.* To vary the diameter of the wheels connecting both shafts, that is to say the size of the parts to be worked.

*c.* To do away, in certain delicate and elaborate work, with the variation of inclination between the tools, variation which necessarily takes place when the movable shaft moves angularly instead of moving parallel to itself.

In the accompanying drawing there is illustrated in elevation and partly in section the preferred form for carrying out the invention.

I designate by the numeral 1 the frame of the machine, which supports the fixed shaft 2 and is provided, above the latter, with a mortise 3 within which the movable shaft 4 can be displaced. This shaft 4 is supported near its ends by two bearings 5 pivoted on slide-blocks 6 vertically guided on both sides of the frame by suitable slides.

8 and 9 designate the tools, such as knurling tools, cutters, etc., secured on the shafts 2 and 4, the rotation of which is obtained by the wheel 14, mounted on the shaft 2 which drives the shaft 4 through the wheels 15 and 16 respectively keyed on the shafts 2 and 4 and the module of which is relatively large.

The vertical displacement of the slide-blocks 6 is effected, in the example shown in the drawing by means of screws 17 each terminated by a journal mounted in a bearing the latter being integral with the slide-block, and each screw is actuated by a crank or the like; these screws are engaged in screw-threaded bores 22 of the frame, or in sockets forming fixed nuts.

The joint 23 of the bearings 5 on the slide blocks allow them to rock slightly and to follow the variable inclination of the shaft 4.

The rear slide-block is made movable for the purpose of permitting to change the pinions 15 and 16 for replacing them by other pinions of different diameters. Once this operation is effected, the working of the machine can take place without displacement of the said slide-block.

The front slide-block is made movable in order to permit the feed or advance of the tool 9 during the work and, on the other hand, to allow the replacement of the tools 8 and 9 by other tools of different diameter.

Finally, the independence of the displacements of both slide-blocks allows to initially give to the shaft 4 a horizontal position or a position inclined according to any angle.

What I claim as my invention and desire to secure by Letters Patent is:

In a machine for knurling, flanging, shearing and molding, a base, a fixed shaft, a movable shaft, a pair of bearings supporting the movable shaft at the ends thereof, two slides movable in the base in a direction perpendicular to the axis of the fixed shaft, pivots connecting the slides to the bearings and the axis of which are perpendicular at the same time, to the plane of movement of the slides and to a plane of the axis of the fixed shaft, other bearings integral with the slides, screws journalled in the last mentioned bearings, and the base having threaded bores for receiving said screws.

In testimony whereof I have signed my name to this specification.

EUGÈNE MARCEL MICHEL.